United States Patent
Tanaka et al.

(10) Patent No.: US 6,277,446 B1
(45) Date of Patent: *Aug. 21, 2001

(54) REFRACTORY COMPOSITION FOR PRODUCING COMPACT CASTABLE AND WET SPRAYING METHOD

(75) Inventors: Kunio Tanaka; Koji Onizuka; Satoshi Ohta, all of Fukuoka-ken (JP)

(73) Assignee: Taiko Refractories Co., Ltd., Fukuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/125,145
(22) PCT Filed: Nov. 12, 1996
(86) PCT No.: PCT/JP96/03316
  § 371 Date: Aug. 11, 1998
  § 102(e) Date: Aug. 11, 1998
(87) PCT Pub. No.: WO98/12153
  PCT Pub. Date: Mar. 26, 1998

(30) Foreign Application Priority Data

Sep. 19, 1996 (JP) .................................................. 8-269399

(51) Int. Cl.⁷ .............................. C04B 35/66; B05D 1/12
(52) U.S. Cl. .......................... 427/421; 427/422; 427/426; 427/427; 501/94
(58) Field of Search .............................. 501/94, 89, 90, 501/100, 101, 109, 111, 118, 119, 121, 122, 128, 129, 131, 133; 427/421, 422, 426, 427

(56) References Cited

U.S. PATENT DOCUMENTS

| | | | | |
|---|---|---|---|---|
| 4,308,067 | * | 12/1981 | Guigonis et al. | ..... 501/105 |
| 4,780,142 | * | 10/1988 | Rechter | ..... 106/600 |
| 5,283,215 | * | 2/1994 | Hosokawa et al. | ..... 501/109 |
| 5,766,689 | * | 6/1998 | Ono | ..... 427/421 |
| 5,869,145 | * | 2/1999 | Iwasaki et al. | ..... 427/427 |

FOREIGN PATENT DOCUMENTS

| | | |
|---|---|---|
| 54-011912 | 1/1979 | (JP) . |
| 59-137367 | * 8/1984 | (JP) . |
| 60-46975 | * 5/1985 | (JP) . |
| 63-162579 | 7/1988 | (JP) . |
| 1-148758 | * 6/1989 | (JP) . |
| 1-212259 | 8/1989 | (JP) . |
| 4-83763 | * 3/1992 | (JP) . |
| 94-17272 | * 3/1994 | (JP) . |

OTHER PUBLICATIONS

Lewis, Hawley's Condensed Chemical Dictionary, pp. 1047–1048, 1068–1069, 1993.*
New Riverside Dictionary, (no author) pp. 274–275, 1994.*

* cited by examiner

*Primary Examiner*—David R Sample
(74) *Attorney, Agent, or Firm*—Sughrue, Mion, Zinn, Macpeak & Seas, PLLC

(57) ABSTRACT

The cement-free, castable refractory composition for producing dense cast refractories according to the present invention comprises 70–98 weight % of refractory aggregate regulated to have a particle size of 10 mm or less, 2–30 weight % of ultrafine refractory powder having a particle size of 10 $\mu$m or less, and 0.01–1.0 weight % (outer percentage), based on 100 weight % of the refractory aggregate+the ultrafine refractory powder, of a dispersing agent. The cement-free, castable refractory composition tempered with water or other tempering liquids to have a castable flowability or the factory-premixed, cement-free, castable refractory composition is conveyed to a gunning nozzle by a pump, and a coagulant is added to the tempered refractory material together with compressed air in the nozzle to carry out gunning.

7 Claims, 1 Drawing Sheet

Coagulability: 1. Good flowability
2. Instantaneous disappearing of flowability
3. Hardening in 2-3 seconds

REFRACTORY COMPOSITION FOR PRODUCING COMPACT CASTABLE AND WET SPRAYING METHOD

FIELD OF THE INVENTION

The present invention relates to a cement-free, castable refractory composition for producing dense cast refractories usable as linings of vessels for molten metals such as ladles, tundishes, troughs, etc., and a method for wet-gunning it.

Refractory materials for linings of vessels for molten metals have lately been changing from bricks to easy-to-apply castables, as the cast refractories have been provided with more and more improved durability. However, casting methods are still disadvantageous in terms of time and labor needed for placement of forms in casting. On the other hand, gunning methods contribute to reduction in time and labor consumption and have versatility in repair, because these methods do not require the placement of forms and can quickly make partial repair. Accordingly, the gunning methods have been finding more and more applications.

Though most widely used now is a dry-gunning method, it produces refractory layers with poor durability and brings about rebounds and dust, resulting in a poor working environment. To overcome the problems of the dry-gunning methods, developments have thus been made recently to provide various gunning methods such as a semi-dry gunning method, a wet-gunning method, etc., and refractory materials therefor.

In the semi-dry gunning method, the gunning refractory material is premixed with part of necessary water by a mixer, pneumatically conveyed to a gunning nozzle by a dry-gunning machine, mixed with the remaining water, or with a solution or a suspension containing a hardening agent in the gunning nozzle (or before reaching the gunning nozzle), and then gunned through the nozzle. The semi-dry gunning methods are exemplified in Japanese Patent Laid-Open No. 61-111973, and Japanese Patent Publication Nos. 2-27308, 6-17273, 5-63437 and 5-21866, etc.

Japanese Patent Laid-Open No. 61-111973 discloses the combination of a hardening accelerator and sodium silicate as a binder, and Japanese Patent Publication Nos. 2-27308, 6-17273 disclose low-cement castables as gunning materials. Also, both of Japanese Patent Publication Nos. 5-63437 and 5-21866, owned by the same applicant, disclose castable refractory materials containing ultrafine powder and dispersing agents, which are not hardened at room temperature. Specifically, in the former reference a refractory clay is used as an indispensable component and hardened by $Ca(OH)_2$, sodium silicate or sodium aluminate introduced at a nozzle to improve the resistance to dry-explosive spalling. In the latter reference, a refractory composition to which a moisture retention agent is added is premixed with water in an amount of ⅕–¾ of the normally required amount in a factory to provide a wet mixture, which is then hardened by sodium silicate, sodium aluminate or colloidal silica introduced at a nozzle.

Though improvements were achieved to some extent in these gunning methods in reducing dust generation and rebound loss, these gunning methods still produce refractory layers with poor adhesion, homogeneity and density, since the refractory materials should be mixed instantaneously with water or an aqueous solution in a nozzle, resulting in poor mixing at an unstable water ratio.

On the other hand, the wet-gunning method is a method in which gunning refractories are premixed with all of water required for gunning, or a method in which factory-premixed refractories delivered in a premixed form are gunned. In the wet-gunning methods, it is possible to add a small amount of an aqueous solution of a hardening agent or a hardening-adjusting agent to the gunning refractories in a nozzle. The wet-gunning methods are classified into a pneumatically conveying method by a gunning machine and a pump-conveying method depending on how to convey gunning materials. In the case of the pumping method, compressed air is introduced into the nozzle to spray refractory materials. The present invention belongs to the latter category. Depending on the amount of water added, there are provided gunning materials with various workabilities ranging from a plastic level to a slurry level.

These wet-gunning methods are exemplified in Japanese Patent Publication Nos. 57-7350, 62-21753, 2-33665, 2-1795, etc. Because the gunning materials disclosed in Japanese Patent Publication No. 57-7350 are in the form of a slurry having a water content of 10–20%, they are not expected to be placed into dense refractory layers suitable for linings of vessels for molten metals. In the latter three methods, the gunning refractory materials are delivered in the form of a moist premix with water or a solution, making it possible for them to be produced and stored in factories as in the present invention. These wet-gunning methods contribute to the reduction of labor and the improvement of the working environment because tempering is not needed at the gunning site.

However, these conventional methods do not utilize the dispersion action of ultrafine refractory powder to reduce the amount of water added. They are also still not different in composition from refractory materials of the previous generations, for instance, because of maximum size of 4 mm or less in particles contained in the gunning materials. In addition, they use gunning machines as refractory-conveying means. Accordingly, the gunned refractory layers are insufficient in denseness and thus considerably poor in durability, as compared with those produced from castable refractory materials, particularly dense castables.

Accordingly, an object of the present invention is to provide a cement-free, castable refractory composition capable of producing dense cast refractories having high density, strength and corrosion resistance at a low water content, and a method for gunning such a cement-free, castable refractory composition.

When ultrafine refractory powder is dispersed in water, there are two types of force, an attraction force and a repulsion force, working among the suspended particles, and the combined force of these two forces is applied to the particles. The attraction force is a van der Waals force, and the repulsion force is an electrostatic force between electric double layers on particle surfaces. When the repulsion force exceeds the attraction force by the function of the dispersing agent, the suspended particles are kept in a dispersed state. In this state, water held among the agglomerated particles is set free as free water which contributes to increase the flowability, making the refractory materials flowable at a low water content.

When an electrolyte (coagulant) releasing ions such as $H^+$, $Mg^{2+}$, $Ca^{2+}$, $Al^{3+}$, $SO_4^{2-}$, $CO_3^{2-}$, etc. is added in a concentration higher than a certain level in this state, the repulsion force decreases such that the attraction force becomes relatively larger than the repulsion force, resulting in rapid coagulation of the ultrafine refractory powder. What utilizes this mechanism is called dense castable refractory materials such as ultra-low-cement castables, low-cement castables, etc. Particularly in the ultra-low-cement castables containing 3 weight % or less of alumina cement, it may be regarded that the alumina cement functions as a coagulant.

However, it is of course impossible to achieve good workabilities at a low-water content simply by adding both of the dispersing agent and the coagulant to the refractory materials, because both additives having opposite properties act simultaneously. Nevertheless, actual refractory materials are usually provided as products containing both dispersing agent and coagulant. Accordingly, the refractory material should have such a composition as to have a mechanism that in a case where the refractory material tempered with a small amount of water is cast while good workability is available by the function of the dispersing agent, setting takes place by the function of the coagulant after the lapse of a certain period of time.

There have been known methods for that purpose; (i) a method using as a coagulant a material such as alumina cement slowly dissolving away ions in water and adding a setting retarder for suppressing the release of ions, and (ii) a method using a coagulant having a high dissolving speed, the coagulant being pre-coated with such materials as gelatin, casein, gum arabic, etc. to retard the coagulation. Nevertheless, it is very difficult to adjust each of the working time (time period in which flowability is maintained) and the setting time (time until which setting finishes) within a predetermined range depending on the variations of ambient temperature, the temperature of an article on which wet-gunning is applied and the working environment, which is an important problem to be overcome.

DISCLOSURE OF THE INVENTION

To cope with problems accompanied by the mechanism that the coagulant functions after the lapse of time in the wet-gunning method, it is necessary that the coagulant exhibits its function immediately after introduction into the nozzle. Namely, it is a primary condition that the coagulant instantaneously exhibits a sufficient coagulating effect to adhere a gunned refractory material to a surface while keeping its shape (without slumping). As a result of various research, the inventors have found that the above problems can be solved in the wet-gunning method by tempering a refractory composition comprising ultrafine refractory powder and a dispersing agent with water or other tempering liquids or other tempering liquids so as to have castable flowability, conveying the tempered mixture to a gunning nozzle by a pump, adding a coagulant to this mixture together with compressed air in the nozzle, and gunning the resulting mixture through the gunning nozzle. The present invention is based on this finding.

Thus, the cement-free, castable refractory composition for producing dense cast refractories according to the present invention comprises 70–98 weight % of refractory aggregate regulated to have a particle size of 10 mm or less, 2–30 weight % of ultrafine refractory powder having a particle size of 10 $\mu$m or less, and 0.01–1.0 weight % (outer percentage), based on 100 weight % of the refractory aggregate+the ultrafine refractory powder, of a dispersing agent.

The factory-premixed, cement-free, castable refractory composition according to the present invention comprises a mixture of the above cement-free, castable refractory composition and a thickener, the mixture being premixed with water or other tempering liquids in advance in a factory in such an amount as to provide the mixture with a castable flowability.

The method for wet-gunning a cement-free, castable refractory composition according to the present invention comprises the steps of conveying the above cement-free, castable refractory composition tempered with water or other tempering liquids so as to have a castable flowability or a factory-mixed, cement-free, castable refractory composition to a gunning nozzle by a pump; adding a coagulant to the tempered mixture together with compressed air in the gunning nozzle; and gunning the resulting mixture through the gunning nozzle.

BEST MODE FOR CARRYING OUT THE INVENTION

Figure 1:
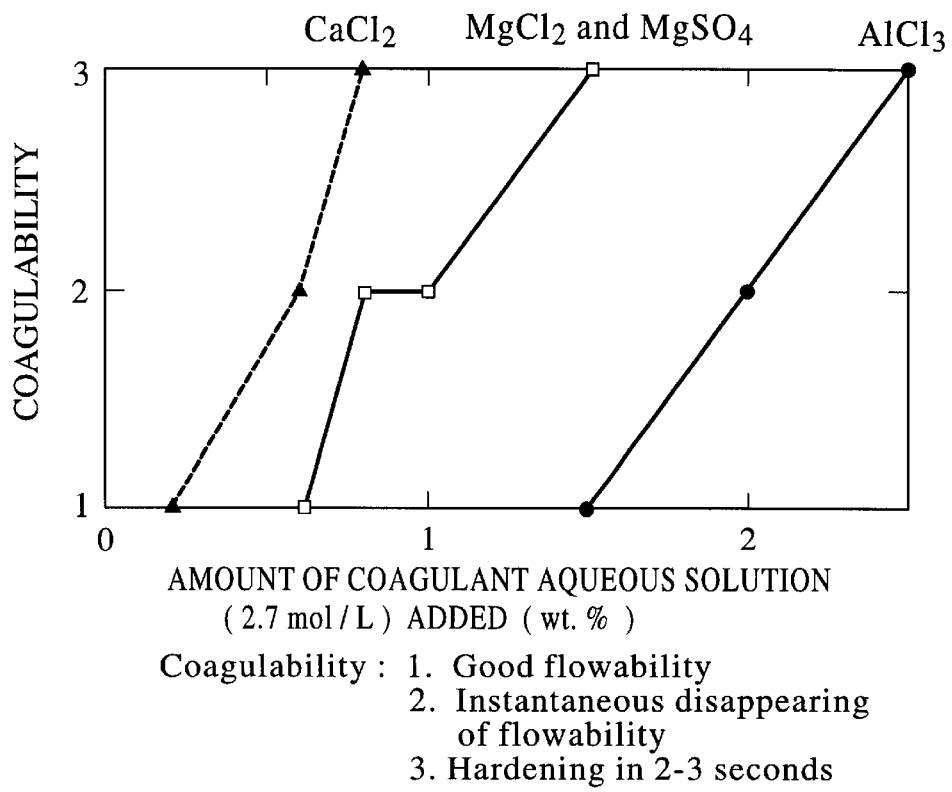
FIG. 1 is a graph showing the relation between the amount of a coagulant aqueous solution added and the coagulability in a case where aqueous solutions of various coagulants were added to ultrafine refractory powder (calcined alumina)

The present invention will be explained in detail below.

[1] Cement-free, Castable Refractory Composition

The cement-free, castable refractory composition of the present invention for wet-gunning comprises (A) refractory aggregate, (B) ultrafine refractory powder, and (C) a dispersing agent.

(A) Refractory Aggregate

The refractory aggregate usable for the present invention may be at least one selected from the group consisting of electrofused alumina, sintered alumina, bauxite, kyanite, andalusite, mullite, chamotte, pyrophyllite, silica, alumina-magnesia spinel, magnesia, zircon, zirconia, silicon carbide, graphite, pitch, etc., and two or more of them may be combined if necessary. The particle size of the refractory aggregate is 10 mm or less. When the particle size of the refractory aggregate is more than 10 mm, pumping efficiency is lowered with increased rebound loss. The amount of the refractory aggregate is 70–98 weight % based on 100 weight % of the refractory aggregate+the ultrafine refractory powder. The preferred amount of the refractory aggregate is 75–95 weight %.

(B) Ultrafine Refractory Powder

The ultrafine refractory powder usable for the present invention may be at least one selected from the group consisting of ultrafine powder of alumina, amorphous silica, silica, titania, mullite, zirconia, chromia, silicon carbide, carbon, etc., and two or more of them may be combined if necessary. The particle size of the ultrafine refractory powder is 10 $\mu$m or less, preferably 1 $\mu$m or less. When the particle size of the ultrafine refractory powder is more than 10 $\mu$m, the water-reducing effect is lowered in combination with the dispersing agent. When the particle size of the ultrafine refractory powder is 1 $\mu$m or less, the water-reducing effect is remarkable.

The amount of the ultrafine refractory powder is 2–30 weight % based on 100 weight % of the refractory aggegate+ultrafine refractory powder. When the amount of the ultrafine refractory powder is less than 2 weight %, the water-reducing effect is lower. When the amount of the ultrafine refractory powder is more than 30 weight %, an increased amount of water is needed for gunning, making the resultant refractory layers suffer from a large shrinkage after burning. The preferred amount of the ultrafine refractory powder is 5–25 weight %.

(C) Dispersing Agent

The dispersing agents usable for the present invention may be one or more selected from alkali metal salts of condensed phosphoric acids such as sodium hexametaphosphate, etc. or alkali metal salts of silicic acids; organic acids such as carboxylic acids, humic acids, alkyl sulfonic acids, aromatic sulfonic acids, etc. or alkali metal salts thereof. The amount of the dispersing agent is 0.01–1 weight % (outer percentage) based on 100 weight % of the refractory aggregate+the ultrafine refractory powder. When the amount of the dispersing agent is less than 0.01 weight %, sufficient dispersion effects are not obtained. When it is more than 1 weight %, optimum dispersion is not achieved. The preferred amount of the dispersing agent is 0.03–0.8 weight %.

[2] Factory-premixed, Cement-free, Castable Refractory Composition

The Factory-premixed, cement-free, castable refractory composition is prepared by premixing the cemrnt-free, castable refractory composition with a thickener with a thickner and water or other tempering liquids in advance in a factory. Thus, it comprises a thickener and water or other tempering liquids in addition to the above refractory aggregate, ultrafine refractory powder and dispersing agent.

(D) Thickener

The thickener acts to prevent the segregation of ingredient particles and the separation of a liquid phase in the course of transporting the factory-premixed, cement-free, castable refractory composition to a gunning site. In addition, it is expected to act as a co-binder. The thickeners used in the present invention are not restricted as long as they are usable as food additives, civil engineering or construction additives, etc. Particularly preferable among others are organic cellulose compounds and/or isobutylene-maleic anhydride copolymers.

The amount of the thickener added is preferably 0.01–1 weight % (outer percentage) based on 100 weight % of the refractory aggregate+the ultrafine refractory powder. When the amount of the thickener is less than 0.01 weight %, thickening effects are too small to prevent the segregation of ingredient particles and the separation of liquid components. On the other hand, when it is more than 1 weight %, such problems as decrease in flowability and in resistance to dry-explosive spalling take place. The preferred amount of the thickener is 0.02–0.8 weight %.

[3] Other Components

Each of the above cement-free, castable refractory composition and the above factory-premixed, cement-free, castable refractory composition may further contain, as other components such as inorganic or metal fibers, agents for preventing dry-explosive spalling such as metallic aluminum, oxycarboxylates, organic fibers, etc.

[4] Gunning Method

The cement-free, castable, refractory composition containing the above constituents is tempered with water or other tempering liquids to have a castable flowability. Though the amount of water or other tempering liquids added may vary largely depending on the particle size distribution of the refractory materials, the porosity of the refractory aggregate, etc., it is about 5–8 weight %. When the amount of water or other tempering liquids added is less than 5 weight %, flowability is insufficient. On the other hand, when the amount of water or other tempering liquids added is more than 8 weight %, slumping of the gunned refractory composition may take place.

The above tempered mixture or the factory-premixed, cement-free, castable refractory composition is conveyed to a gunning nozzle by a pump and gunned through the nozzle into which a coagulant and compressed air are injected.

(E) Coagulant

The coagulant is preferably an electrolyte releasing ions such as $H^+$, $OH^-$, or divalent or trivalent cations or anions (opposite surface charge) such as $Mg^{2+}$, $Ba^{2+}$, $Ca^{2+}$, $Al^{3+}$, $SO_4^{2-}$, $CO_3^{2-}$, etc. The coagulation mechanism models in the present invention seem to be isoelectric coagulation (charge-neutralizing coagulation) and Schultz-Hardy coagulation. Specifically speaking, hydrogen ion or hydroxide ion is a potential-determining ion in most metal oxides, and the isoelectric coagulation occurs by adding a small amount of the potential-determining ion to eliminate the repulsion force of the electric double layer. On the other hand, the coagulation caused by an electrolyte which does not pose any influence such as adsorption on particles per se but increases the ion intensity of a medium to compress the electric double layer of particles, thereby making the electric repulsion force of particles smaller than the coagulation force, is called Schultz-Hardy coagulation or simply coagulation. Coagulates made by the Schultz-Hardy coagulation are relatively dense.

The electrolyte is preferably added in the form of an aqueous solution. The coagulant (electrolyte) aqueous solution is preferably supplied by a fixed displacement pump operable synchronously with a pump for conveying the tempered castable refractory composition. The amount of the coagulant aqueous solution is suitably 0.1–1.5 weight % (outer percentage, converted to a concentration of 2.7 mol/liter) based on 100 weight % of the refractory aggregate+the ultrafine refractory powder, though it may depend on its concentration. When the amount of the coagulant aqueous solution is less than 0.1 weight %, a sufficient coagulation effect cannot be achieved. On the other hand, when the amount of the coagulant aqueous solution is more than 1.5 weight %, the resultant gunned products have reduced denseness (lower bulk density). The preferred amount of the coagulant aqueous solution is 0.2–1.3 weight %.

The present invention will be explained more specifically by Examples below without intention of restricting the present invention.

Reference Example 1

Calcined alumina $A_1$ having an average particle size of 4 μm was used as ultrafine refractory powder, and 100 g of the calcined alumina $A_1$ was mixed with 1.5 g of a dispersing agent (sodium hexametaphosphate) in a container. When water was slowly added to the resultant mixture, the mixture showed good flowability at a water content of 24 g.

Each of the following coagulant aqueous solutions in a concentration of 2.7 mol/liter was added to the resultant slurry and quickly stirred to examine the coagulability of the slurry.

| Coagulant | Specific Gravity |
| --- | --- |
| $CaCl_2$ | 1.21 |
| $MgCl_2$ | 1.17 |
| $MgSO_4$ | 1.31 |
| $AlCl_3$ | 1.25 |

Comparison was made on how quickly each coagulant aqueous solution exhibited its coagulating effect on the calcined alumina $A_1$. The coagulability of the slurry was classified into three ranks, in which rank 1 represents keeping good flowability, rank 2 represents instantaneous disappearing of flowability, and rank 3 represents hardening in 2–3 seconds. The results are shown in FIG. 1. As is clear from FIG. 1, any of these coagulant aqueous solutions instantaneously coagulated the slurry in small amounts.

Reference Example 2

Figure 2:
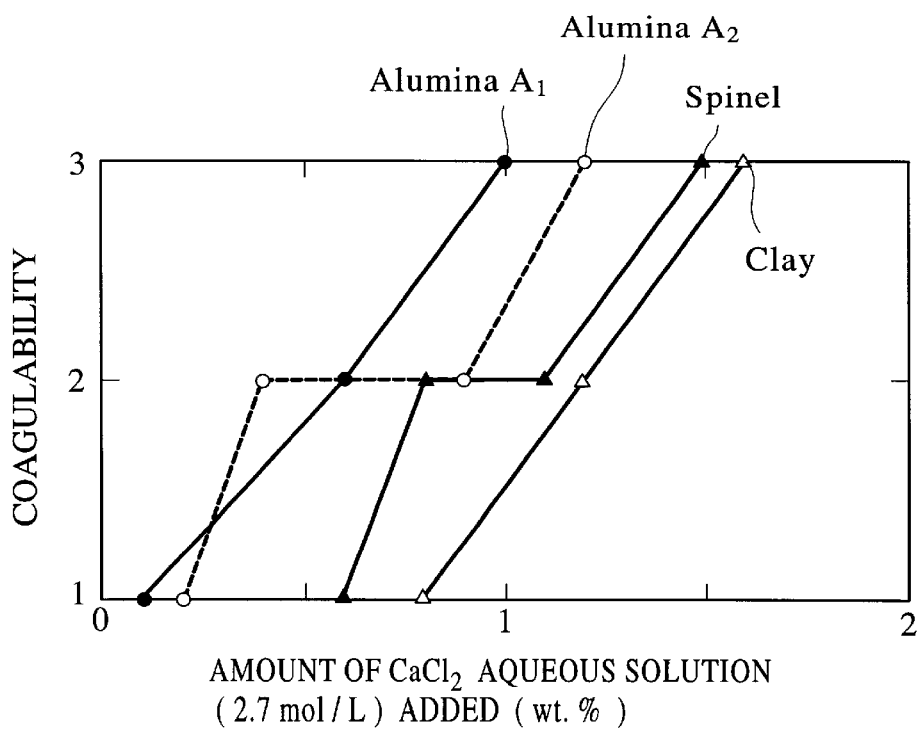
FIG. 2 is a graph showing the relation between the amount of a coagulant aqueous solution added and the coagulability in a case where an aqueous solution of a coagulant (calcium chloride) was added to various types of ultrafine refractory powder.

A Calcium chloride aqueous solution in a concentration of 2.7 mol/liter was used as a coagulant aqueous solution to examine the coagulation properties of various types of ultrafine refractory powder. Used as the ultrafine refractory powders were calcined alumina $A_1$ (average particle size: 4 $\mu$m), calcined alumina $A_2$ (average particle size: 0.7 $\mu$m), kaolin clay (average particle size: 3 $\mu$m), and spinel ($MgO.Al_2O_3$) (average particle size: 3.3 $\mu$m). The amount of water required to obtain the flowability of the slurry varied depending on the types of the ultrafine refractory powders used. The amounts of water required for 100 g of the above ultrafine refractory powders and 1.5 g of sodium hexametaphosphate were 24 g, 25.5 g, 35 g and 23 g, respectively. The results are shown in FIG. 2. As is clear from FIG. 2, coagulation took place faster in the order of alumina $A_1$>alumina $A_2$>spinel>clay.

EXAMPLES 1–4

Comparative Examples 1–4

1. Formulations

The formulations of refractory compositions are shown in Table 1. $Al_2O_3$—SiC—C refractory compositions were used in Examples 1, 2 and 4 and Comparative Examples 1–3, and $Al_2O_3$—MgO refractory compositions were used in Example 3 and Comparative Example 4. Used Example 4 was a factory-premixed, cement-free, castable refractory composition which was premixed at a tempering water content of 6.1 weight % in factory.

2. Gunning

Those obtained by adding a premixing amount of water to the castable refractory compositions and tempering them in Examples 1–3 and Comparative Example 1, or the factory-premixed, cement-free, castable refractory composition in Example 4 was conveyed to a gunning nozzle by a pump. Gunning was carried out after a coagulant aqueous solution in an amount (outer percentage) shown in Table 1 and compressed air were added in the gunning nozzle in Examples 1–4, or without adding the coagulant aqueous solution in Comparative Example 1.

The castable refractory composition having the formulation shown in Table 1 was cast in Comparative Example 2. The castable refractory compositions having the formulations shown in Table 1, which were premixed with a small amount of water, were pneumatically conveyed to a nozzle by a gunning machine in Comparative Examples 3 and 4. An aqueous solution of sodium aluminate was added as a setting agent in the nozzle in Comparative Example 3, while only water was added in the nozzle to carry out a semi-dry gunning in Comparative Example 4.

After gunning, each gunned layer was cut to a predetermined size and dried to provide test pieces. The amount of water added in the entire process of gunning is shown in Table 1. In Comparative Example 2, the castable refractory composition was tempered with a premixing amount of water, cast into a mold and aged and dried in the mold to prepare test pieces. In Comparative Example 1, gunning could not be carried out, failing to produce test pieces. The methods employed in Examples and Comparative Examples are also shown in Table 1.

TABLE 1

Formulation and Formation Method

| | Example No. | | | |
|---|---|---|---|---|
| | 1 | 2 | 3 | 4 |
| Refractory Aggregate | | | | |
| Electrofused Alumina (8-5 mm)[1] | 17 | 17 | — | 17 |
| Electrofused Alumina (5-1 mm)[2] | 35 | 35 | 45 | 35 |
| Electrofused Alumina (3-1 mm)[3] | — | — | — | — |
| Electrofused Alumina (≦1 mm)[4] | 16 | 16 | 25 | 16 |
| Magnesia Clinker[5] | — | — | 10 | — |
| Silicon Carbide[6] | 18 | 18 | — | 18 |
| Pitch[7] | 2 | 2 | — | 2 |
| Ultrafine Refractory Powder | | | | |
| Ultrafine Alumina Powder[8] | 8 | 8 | 19 | 8 |
| Amorphous Silica[9] | 3 | 3 | 1 | 3 |
| Carbon Black[10] | 1 | 1 | — | 1 |
| Clay[11] | | | | |
| Cement Component | | | | |
| Alumina Cement[12] | — | — | — | — |
| Dispersing Agent[13] | | | | |
| Sodium Hexametaphosphate | 0.1 | 0.1 | 0.1 | 0.1 |
| Thickener[13] | | | | |
| CMC[14] | — | — | — | 0.02 |
| IB-MA Copolymer[15] | — | — | — | 0.02 |
| Agent for Preventing Dry-Explosive Spalling[13] | | | | |
| Organic Fibers | 0.05 | 0.05 | 0.05 | 0.05 |
| Coagulant[13] | | | | |
| $CaCl_2$ Aqueous Solution[16] | 0.5 | — | — | 0.5 |
| $MgSO_4$ Aqueous Solution[16] | — | 0.6 | — | — |

TABLE 1-continued

| Formulation and Formation Method | | | | |
|---|---|---|---|---|
| $AlCl_3$ Aqueous Solution[16] | — | — | 0.7 | — |
| Setting Agent[13] | | | | |
| Sodium Aluminate Aqueous Solution[17] | — | — | — | — |
| Amount of Premixed Water[13] | 5.2 | 5.2 | 5.5 | 6.1 |
| Total Water in Gunned Layer[13] | 5.6 | 5.6 | 6.0 | 6.6 |
| Note | — | — | — | PM[18] |
| Formation Method | Present Invention | Present Invention | Present Invention | Present Invention |

Note:
[1]Particle size: more than 5 mm and 8 mm or less, unit: weight %.
[2]Particle size: more than 1 mm and 5 mm or less, unit: weight %.
[3]Particle size: more than 1 mm and 3 mm or less, unit: weight %.
[4]Particle size: 1 mm or less, unit: weight %.
[5]Particle size: 1 mm or less, unit: weight %.
[6]Particle size: 150 μm or less, unit: weight %.
[7]Particle size: 1 mm or less, unit: weight %.
[8]Particle size: 10 μm or less, unit: weight %.
[9]Particle size: 1 μm or less, unit: weight %.
[10]Particle size: 1 μm or less, unit: weight %.
[11]Unit: weight %.
[12]JIS Class 1, unit: weight %.
[13]Unit: weight % (outer percentage).
[14]Carboxymethyl cellulose.
[15]Isobutylene-maleic anhydride copolymer.
[16]Concentration: 2.7 mol/liter.
[17]Concentration: 30 weight %.
[18]Premixed type.

| | Comparative Example No. | | | |
|---|---|---|---|---|
| | 1 | 2 | 3 | 4 |
| Refractory Aggregate | | | | |
| Electrofused Alumina (8-5 mm)[1] | 17 | 17 | — | — |
| Electrofused Alumina (5-1 mm)[2] | 35 | 35 | — | — |
| Electrofused Alumina (3-1 mm)[3] | — | — | 40 | 45 |
| Electrofused Alumina (≤1 mm)[4] | 16 | 16 | 26 | 25 |
| Magnesia Clinker[5] | — | — | — | 10 |
| Silicon Carbide[6] | 18 | 18 | 18 | — |
| Pitch[7] | 2 | 2 | 2 | — |
| Ultrafine Refractory Powder | | | | |
| Ultrafine Alumina Powder[8] | 8 | 8 | 7 | 12 |
| Amorphous Silica[9] | 3 | 3 | 3 | 1 |
| Carbon Black[10] | 1 | 1 | 1 | — |
| Clay[11] | — | — | 3 | 2 |
| Cement Component | | | | |
| Alumina Cement[12] | — | — | — | 5 |
| Dispersing Agent[13] | | | | |
| Sodium Hexametaphosphate | 0.1 | 0.1 | 0.1 | — |
| Thickener[13] | | | | |
| CMC[14] | — | — | — | 0.03 |
| IB-MA Copolymer[15] | — | — | — | — |
| Agent for Preventing Dry-Explosive Spalling[13] | | | | |
| Organic Fibers | 0.05 | 0.05 | 0.05 | 0.05 |
| Coagulant[13] | | | | |
| $CaCl_2$ Aqueous Solution[16] | — | — | — | — |
| $MgSO_4$ Aqueous Solution[16] | — | — | — | — |
| $AlCl_3$ Aqueous Solution[16] | — | — | — | — |
| Setting Agent[13] | | | | |
| Sodium Aluminate Aqueous Solution[17] | — | — | 6.0 | — |
| Amount of Premixed Water[13] | 5.2 | 5.2 | 3.0 | 3.0 |
| Total Water in Gunned Layer[13] | 5.2 | — | 7.2 | 12.3 |
| Note | — | — | — | — |
| Formation Method | Wet-gunning | Casting | Semi-dry gunning | Semi-dry gunning |

Note: (1)–(17) The same as above.

3. Evaluation (1) Evaluation of Test Pieces

After measuring the bulk specific gravity of each test piece burned at 1,000° C. and 1,500° C., a bending strength and an index of corrosion were measured under the following conditions. The test results are shown in Table 2.

(i) Bending Strength (kgf/cm$^2$)

Each test piece was measured with respect to bending strength after burning (1,000° C. and 1,500° C.) and hot-bending strength (1,500° C.) according to JIS R2553.

(ii) Rotary Corrosion Test

In Group A (Examples 1, 2 and 4 and Comparative Examples 2 and 3), a rotary corrosion test was carried out at 1,500° C. for 5 hours using a blast furnace slag as a corrosive material. In Group B (Example 3 and Comparative Example 4), the rotary corrosion test was carried out at 1,650° C. for 5 hours using a converter slag (CaO/SiO$_2$ molar ratio: 4.2) as a corrosive material.

The corroded test pieces were collected to measure an corrosion depth. The corrosion depth divided by the time (hour) was expressed as an index of corrosion (relative value), assuming that the value of Example 1 in Group A was 100, and that the value of Example 3 in Group B was 100. The larger the index of corrosion, the more the test pieces are corroded.

As is clear from Table 2, the refractory materials in Examples 1–4 were well gunned to form refractory products without slumping, while gunning was not well conducted due to slumping in Comparative Example 1 because no coagulant was added in a nozzle in the wet-gunning process. The semi-dry, gunning in Comparative Examples 3 and 4 suffered much dust and rebound loss.

With respect to the quality of the gunned refractory products, the bulk specific gravity has a close relation to the denseness of the gunned refractory products. The wet-gunned refractory products of Examples 1–4 have much higher bulk specific gravity than that of the semi-dry gunned refractory product, and slightly lower bulk specific gravity than that of the cast refractory product of Comparative Example 2. There is the same tendency in the index of corrosion determined by the rotary corrosion test as in the bulk specific gravity. The wet-gunned refractory products of Examples 1–4 show corrosion resistance comparable to that of Comparative Example 2, while those of Comparative Examples 3 and 4 are very poor.

Application of the Invention in Industry

Gunned refractory products having quality and corrosion resistance which are much better than those of the conventional gunned refractory products and comparable to those of the cast refractory products can be obtained by supplying

TABLE 2

Gunning Characteristics and Quality of Gunned Test Pieces

| | Example No. | | | |
|---|---|---|---|---|
| | 1 | 2 | 3 | 4 |
| Gunning Characteristics | Good No slumping | Good No slumping | Good No slumping | Good No slumping |
| Bulk Specific Gravity | | | | |
| at 1,000° C. | 2.85 | 2.86 | 3.03 | 2.84 |
| at 1,500° C. | 2.85 | 2.85 | 3.00 | 2.85 |
| Bending Strength after Burning[1] | | | | |
| at 1,000° C. | 49 | 51 | 61 | 45 |
| at 1,500° C. | 68 | 77 | 153 | 63 |
| Hot-Bending Strength[1] | | | | |
| at 1,500° C. | 28 | 31 | 21 | 25 |
| Rotary Corrosion Test | | | | |
| Index of Corrosion | 100 | 98 | 100 | 103 |

Note: [1]Unit: kgf/cm$^2$.

| | Comparative Example No. | | | |
|---|---|---|---|---|
| | 1 | 2 | 3 | 4 |
| Gunning Characteristics | Couldn't be gunned by slumping | — | Much rebound loss and dust | Much rebound loss and dust |
| Bulk Specific Gravity | | | | |
| at 1,000° C. | — | 2.89 | 2.57 | 2.41 |
| at 1,500° C. | — | 2.88 | 2.60 | 2.37 |
| Bending Strength after Burning[1] | | | | |
| at 1,000° C. | — | 55 | 39 | 32 |
| at 1,500° C. | — | 81 | 49 | 38 |
| Hot-Bending Strength[1] | | | | |
| at 1,500° C. | — | 32 | 15 | 12 |
| Rotary Corrosion Test | | | | |
| Index of Corrosion | — | 93 | 153 | 303 |

Note: (1) Same as above.

a cement-free, castable refractory composition containing ultrafine refractory powder of 10 μm or less and a dispersing agent which is premixed with water by a mixer to have a castable flowability, or a factory-premixed, cement-free, castable refractory composition to a gunning nozzle by a pump; adding a small amount of a coagulant (electrolyte) aqueous solution thereto together with compressed air in the nozzle; and then gunning the resultant mixture.

Since the cement-free, castable refractory composition of the present invention is not hardened without adding a coagulant and need not be hardened, it is free from troublesome problems that working time and hardening time should be controlled. Accordingly, the tempered or factory-premixed, cement-free, castable, refractory composition does not harden in a hose or a pipe in the course of transportation to a nozzle by a pump, avoiding such problems as to clog the hose or the pipe. With respect to the supply of the refractory composition, it is possible to temper the cement-free, castable refractory composition with water or other tempering liquids in advance to provide it in the form of a premixed type.

Further, the present invention has the following advantages:

(1) gunned products have denseness and good properties comparable to those of cast products.
(2) Manual labor can drastically be slashed because troublesome labor of constructing forms as in the casting methods is not needed.
(3) the refractory materials can stably be supplied to a nozzle by pumping, making it possible to add a coagulant aqueous solution in a constant amount without necessitating strict manual control. Namely, the control of water supply can be carried out without being affected by the skill and experience of nozzlemen, unlike in the case of conventional semi-dry or dry gunning.
(4) Because the refractory materials are supplied in a completely flowable state, no dust is generated with extremely little rebound loss unlike in the case of conventional gunning methods.

What is claimed is:

1. A method for wet-gunning a cement-free, castable refractory composition comprising the steps of:

(a) tempering a cement-free, castable refractory composition comprising 70–98 weight % of refractory aggregate regulated to have a particle size of 10 mm or less, 2–30 weight % of ultrafine refractory powder having a particle size of 10 μm or less, and 0.01–1.0 weight %, based on the total amount, 100 weight %, of said refractory aggregate+said ultrafine refractory powder, of a dispersing agent, with water or another tempering liquid to provide a tempered mixture having a castable flowability;

(b) conveying the tempered mixture to a gunning nozzle by a pump;

(c) adding a coagulant and compressed air to said tempered mixture in said gunning nozzle; and (d) gunning the resulting mixture through said gunning nozzle.

2. The method for wet-gunning a cement-free, castable refractory composition according to claim 1, wherein said coagulant is at least one of calcium chloride, magnesium chloride and aluminum chloride.

3. The method for wet-gunning a cement-free, castable refractory composition according to claim 1, wherein said coagulant is added in an amount of 0.1–1.5 weight %, converted to a concentration of 2.7 mol/liter, based on 100 weight % of said refractory aggregate+said ultrafine refractory powder.

4. A method for wet-gunning a factory-premixed, cement-free, castable refractory composition comprising the steps of:

(a) tempering a cement-free, castable refractory composition comprising 70–98 weight % of refractory aggregate regulated to have a particle size of 10 mm or less, 2–30 weight % of ultrafine refractory powder having a particle size of 10 μm or less, 0.01–1.0 weight %, based on the total amount, 100 weight %, of said refractory aggregate+said ultrafine refractory powder, of a dispersing agent and a thickener, with water or another tempering liquid to provide a factory-premixed, cement-free, castable refractory composition having a castable flowability in factory;

(b) conveying said factory-premixed, cement-free, castable refractory composition to a gunning nozzle by a pump;

(c) adding a coagulant and compressed air to said factory-premixed, cement-free, castable refractory composition in said gunning nozzle; and (d) gunning the resulting mixture through said gunning nozzle.

5. The method for wet-gunning a factory-premixed, cement-free, castable refractory composition according to claim 4, wherein said coagulant is at least one of calcium chloride, magnesium chloride and aluminum chloride.

6. The method for wet-gunning a factory-premixed, cement-free, castable refractory composition according to claim 4, wherein said coagulant is added in an amount of 0.1–1.5 weight %, converted to a concentration of 2.7 mol/liter, based on 100 weight % of said refractory aggregate+said ultrafine refractory powder.

7. The method for wet-gunning a factory-premixed, cement-free, castable refractory composition according to claim 6, wherein said thickener is an organic cellulose compound and/or an isobutylene-maleic anhydride copolymer.

* * * * *